Patented June 21, 1949

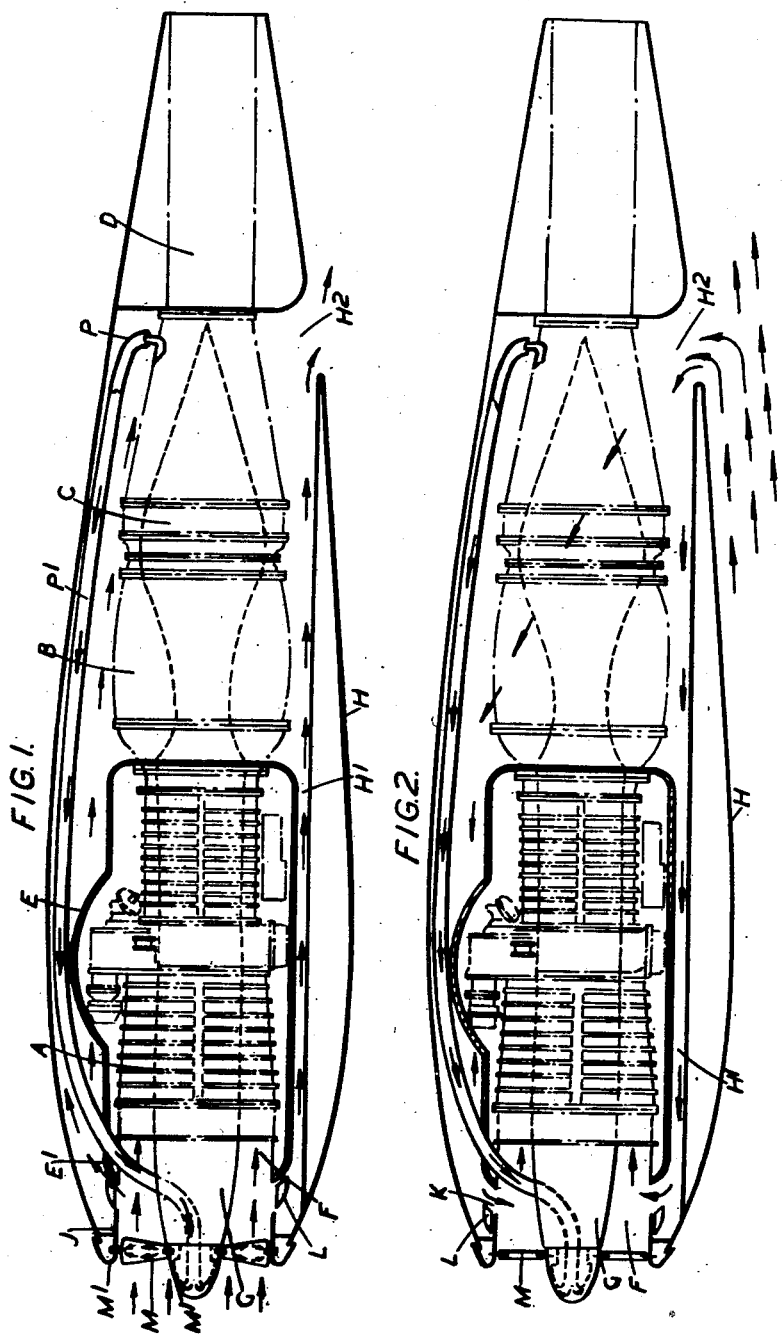

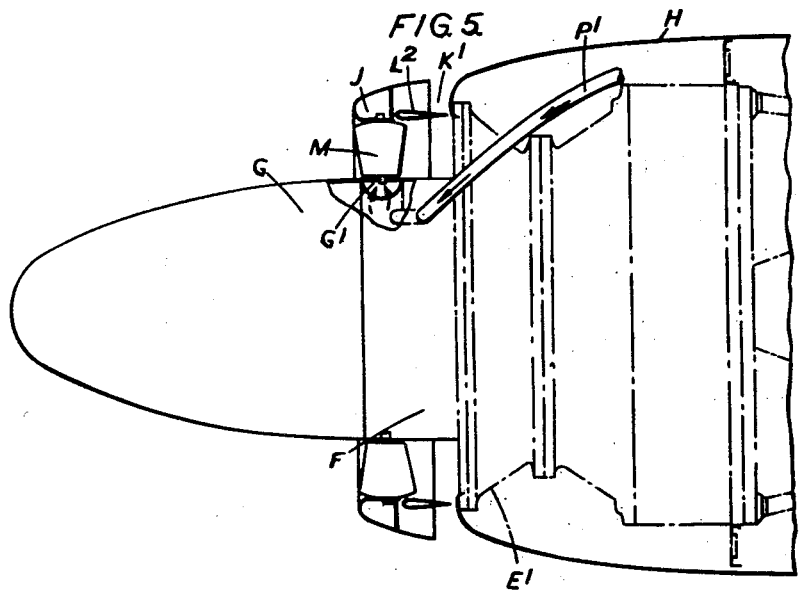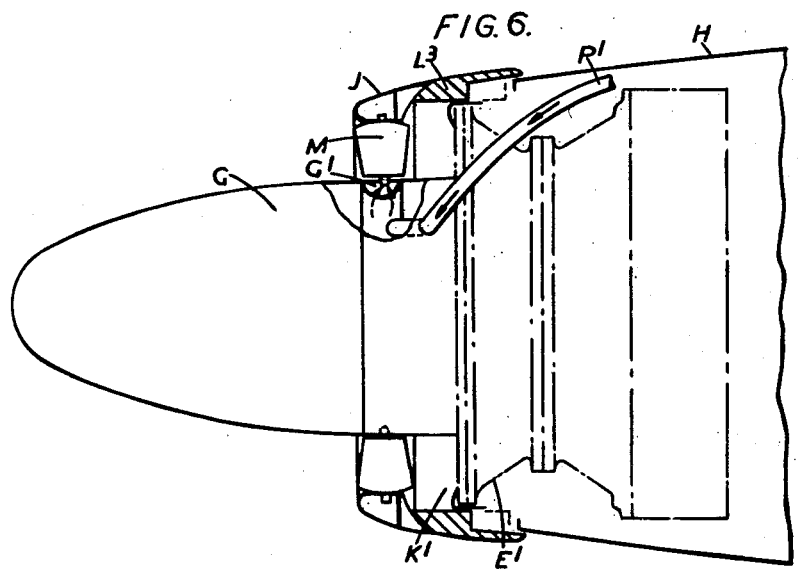

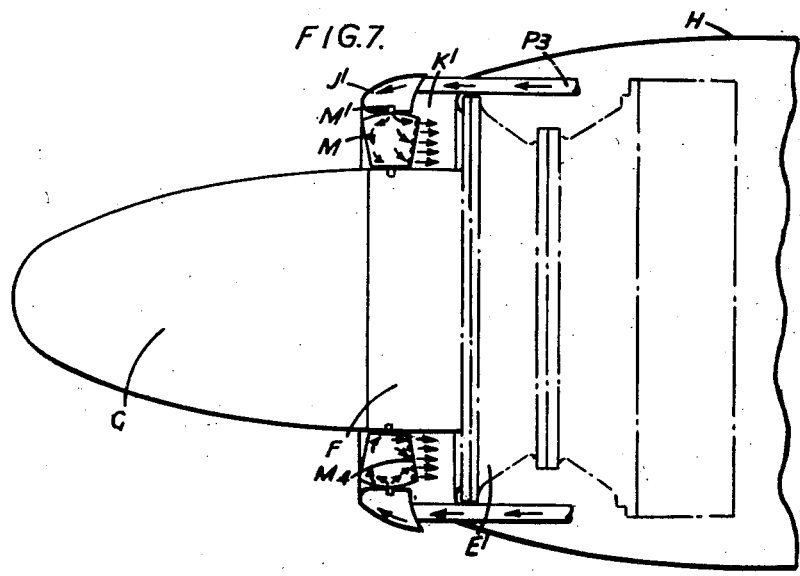
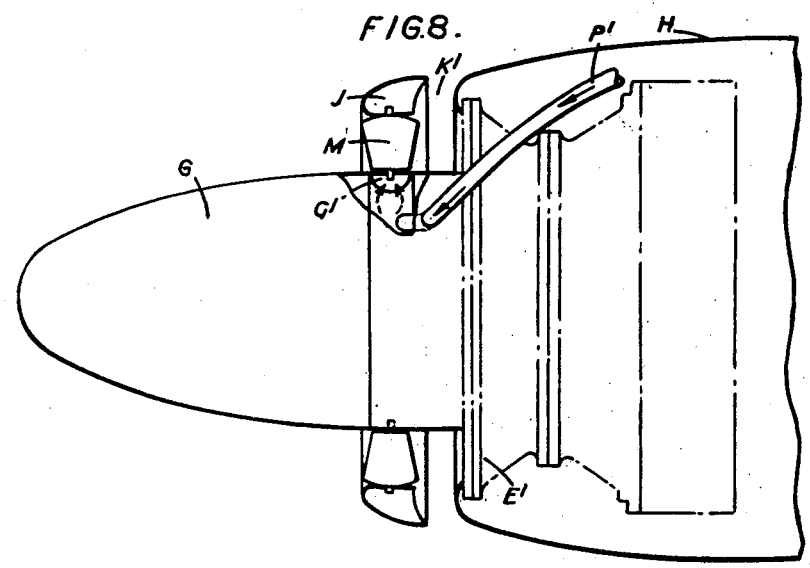

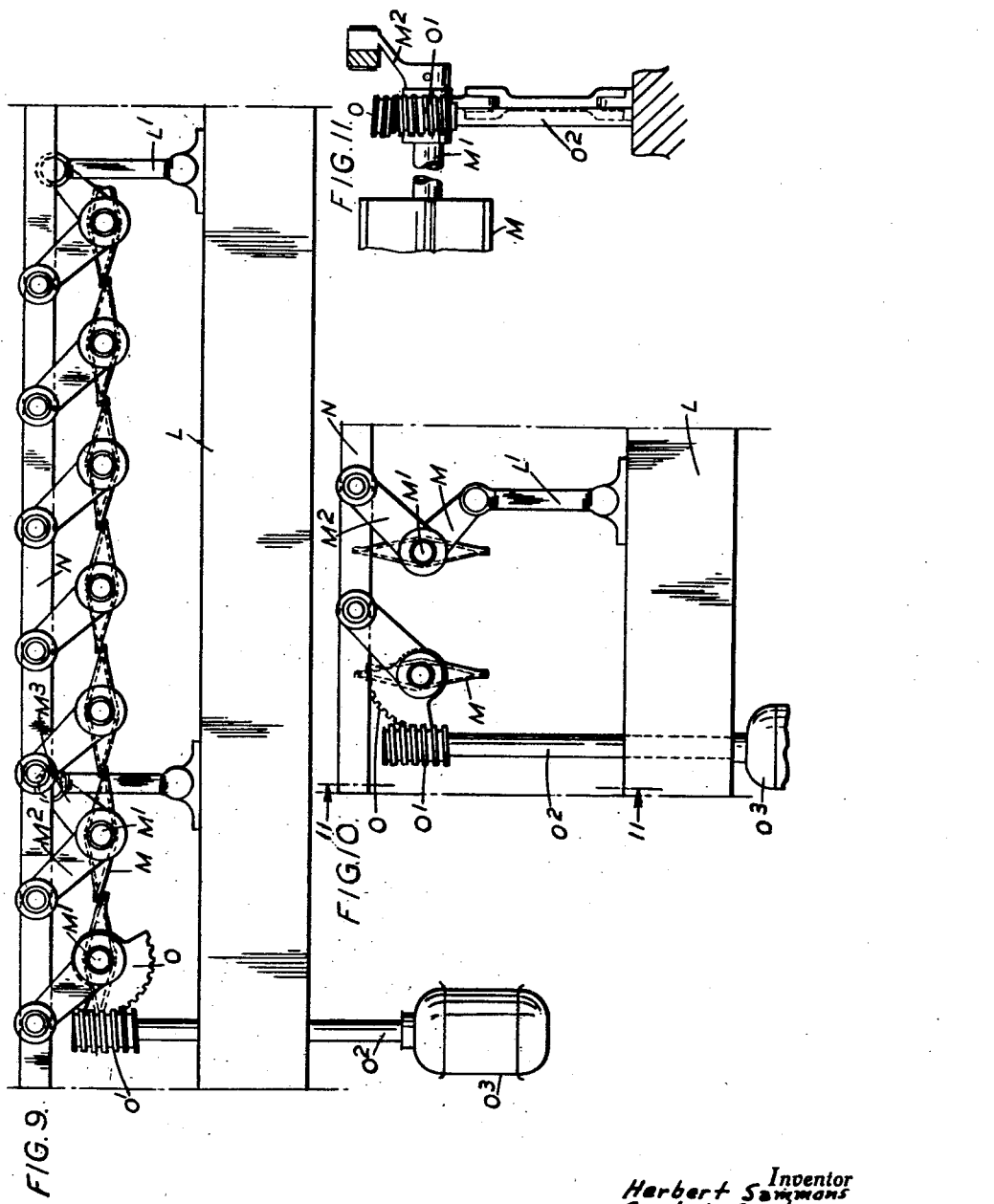

2,474,068

UNITED STATES PATENT OFFICE 2,474,068

AIR INTAKE SYSTEM OF INTERNAL-COMBUSTION ENGINES

Herbert Sammons, Gerrards Cross, and Cecil Louis Cowdrey, Markyate, England, assignors to D. Napier & Son Limited, London, England, a company of Great Britain Application April 19, 1948, Serial No. 22,018
In Great Britain April 21, 1947

5 Claims. (Cl. 230—132)

This invention relates to the air intake systems of internal combustion power plants and is more particularly applicable to such engines as are employed for the propulsion of fast moving vehicles such as aircraft, and has for its object to prevent ice and foreign matter being carried into the engine with the air.

It is known practice more particularly in aircraft to provide an air intake with its opening directed forwards so that advantage may be taken of the ramming or impact pressure of the approaching air. When this air is used for the combustion of fuel in the engine, it is known that this ramming pressure set up in the intake produces an increase in the engine power output. This increased power output, however, is not achieved without some increase of drag due to the fact that the momentum of the incoming air is partially destroyed and its velocity energy converted in part to pressure energy.

Where the air is collected by a forward facing scoop and is thus subject to the impact pressure or where it is taken in through an aperture facing in the rearward direction, the air which is aspirated by the engine must achieve a velocity substantially equal to that of a moving vehicle, and in so doing a change of momentum and hence a drag force is inevitable. An exception to this rule occurs when the air for engine consumption is drawn from slots or apertures close to the skin of the aircraft where by virtue of viscous friction there exists a boundary layer which is virtually stationary relative to the surface of the vehicle. In this case the air required for engine consumption is being carried along with the vehicle and hence has no velocity relatively to it. Under these circumstances, the momentum of the inducted air is unchanged relatively to the vehicle and the momentum drag will thus be zero. An intake of this type is known as a boundary layer intake.

In an air intake which faces forward it is known that under certain atmospheric conditions supercooled moisture particles, rain and snow may adhere to certain surfaces of the intake and of the engine induction passages in the form of an ice layer which may damage the engine. Ice may also form on vital internal portions of the engine, and in particular in the case of gas turbine engines ice may form on the first rows of blades in the stator and rotor of the compressor. The object of the present invention is to provide means whereby the advantages of a forward facing intake may be achieved while at the same time safeguarding the engine against the dangers of ice formation in the intake passages and those parts of the engine where the risk of damage is greatest.

According to this invention the air intake system for an internal combustion power plant which is subject to icing conditions comprises in combination an annular air intake passage running in the fore and aft direction and through which air can flow to the engine, an annular opening at the front end of this passage constituting a forwardly facing air intake through which air can enter freely when the vehicle is moving, shutter members through which gas can pass each of which is rotatable about a radial axis, these members extending across the forward facing intake opening which by means of these shutter members can be wholly or partially closed, an annular opening in the outer wall of the intake passage and through which air can enter the passage laterally when the forward facing intake opening is closed, and means for supplying hot gas to parts adjacent to the said forwardly facing intake opening so that this hot gas can flow through the radial shutter members. Means are provided for closing the annular lateral intake opening when the forward facing opening is open. For example, the closing of the lateral intake opening may be effected by a sliding shutter or by a series of gill-like flaps. Conveniently the radial shutter members which control the inflow through the forward facing opening and the sliding shutter or other means for controlling the air flow through the lateral intake opening are interconnected so that rotation of the radial shutter members and actuation of the means by which the lateral air intake can be closed or open will take place simultaneously. The hot gas is drawn from a point in the rear of the power plant and conveniently from the passage through which flow away the exhaust gases from the power plant. Towards the rear of the power plant there is a lateral opening in the cowling through which when the forwardly facing intake opening is closed by the radial shutters air is drawn from the boundary layer and after flowing over the power plant in the forward direction the air will enter the intake passage through the lateral annular opening.

The accompanying drawings illustrate by way of example alternative arrangements for carrying the invention into practice. In these drawings, Figure 1 is a somewhat diagrammatic longitudinal sectional elevation of a power plant as mounted in an aircraft illustrating one arrangement according to the invention. In this figure the radial shutters in the forwardly facing opening leading to the annular air intake are shown as turned so as to leave this intake open for the free inflow of air.

Figure 2 is a similar view, but showing the radial shutters turned so as to close the forwardly facing opening into the air intake.

Figure 5 is a view similar to Figure 4, but showing the lateral intake opening closed and the forwardly facing intake opening open.

Figure 6 is again a similar view showing an alternative method of closing the lateral intake opening.

Figure 7 is again a similar view showing one way of supplying hot gas to the radial shutters, the lateral intake opening in this case being provided with no means for closing it, this opening being always open.

Figure 8 is a view of an arrangement similar to Figure 7 except that there is shown an alternative method of supplying the hot gas to the radial shutters.

Figure 3:
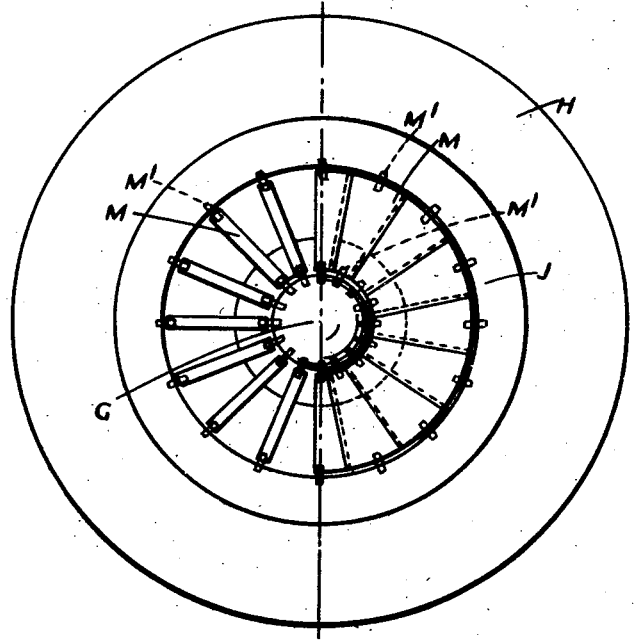
Figure 3 is an end view of the arrangement shown in Figure 1, the left half of this view showing the intake opening as seen with the radial shutters turned to allow the free entry of air as in Figure 1, while the righthand side of Figure 3 shows the intake opening closed by the shutters turned into the positions as indicated in Figure 2.

Figure 9 shows on an enlarged scale and in a projected plan a portion of the structure about the forwardly directed opening and illustrating by way of example mechanism by means of which the radial shutters can be turned at the same time as a sliding shutter is moved to close or open the lateral air intake, as for instance in an arrangement such as that illustrated in Figures 1 and 2. In Figure 9 the radial shutters are shown as being rotated so as to close the forwardly facing intake opening while the sliding shutter has been moved simultaneously to allow air to enter the intake passage through the annular lateral opening.

Figure 10 is a portion of a view similar to Figure 9 but showing the parts in the positions occupied by them when the radial shutters have been turned to allow air to enter freely the intake passage while the sliding shutter has been moved to close the lateral intake opening.

Figure 11 is a sectional elevation on the line 11—11 in Figure 10 looking in the direction of the arrows.

Referring to Figures 1 and 2 of the drawings, the invention is here shown by way of example as employed in conjunction with an internal combustion turbine propulsive plant mounted in an aircraft. Such a plant as commonly known comprises as its chief features a compressor A of the axial flow type delivering air to several combustion chambers B wherein fuel is burnt, the gases from these chambers then acting on a turbine situated at C, this turbine driving the compressor A. The gases from the turbine in this case flow through the passage D and issue as a jet with propulsive force. The compressor A, the combustion chambers B and the turbine C are arranged about a common axis and the compressor is enclosed in a casing E the forward end of which constitutes the outer wall of an annular intake passage F around a central member G, air for the compressor flowing through the annular passage F. The whole power plant is further enclosed in a cowling H which provides an annular space $H^1$ around the plant and outside the casing E.

As will be seen the annular intake passage F is forwardly directed and the part G which lies in the centre of this passage is in effect a fairing terminating at its forward end in a rounded nose. This part G constitutes the inner wall or surface of the intake passage F. The outer wall of this passage forward of the compressor is constituted in part by an extension $E^1$ of the casing E enclosing the compressor and a part J which is hollow and carried by the forward end of the cowling H, this part lying around the fairing G. Between the part J and the part $E^1$ is a gap K which constitutes a lateral annular opening into the intake passage F, this opening leading in this case from the space $H^1$ within the cowling H. The member J carries slidably mounted thereon an annular shutter L by means of which the gap or lateral opening K can be wholly or partially closed. Air may flow in either direction through the annular gap K according to the position of the shutter L and whether the main direct inflow of air into the forward end of the intake passage F is permitted or obstructed.

The flow of air through the main inflow opening is controlled by the adjustment of a series of sector-shaped shutters M each of which is rotatable about a radial axis, each shutter having at each end trunnion bearings $M^1$ carried respectively by the fairing G and by the member J forming the inner and outer walls of the entry to the intake passage F.

Referring to Figures 9, 10 and 11, where are shown by way of example apparatus for rotating these shutters, it will be seen that each shutter M has on one of the bearing pins $M^1$ a lever $M^2$ and all these levers are connected by a link N of suitable construction. On the bearing pin $M^1$ of one of the shutters is a toothed sector O which meshes with a worm $O^1$ on the shaft $O^2$ of an electric motor $O^3$. By means of this motor and through the link N all the shutters M can be turned simultaneously about their axes. The sliding shutter L is connected by links $L^1$ with levers $M^3$ on the bearing pins or trunnions $M^1$ of certain shutters M suitably spaced apart circumferentially. Thus as the shutters M are rotated the sliding shutter L will be moved over the gap K the arrangement being such that when the shutters M have been turned so as to allow air to enter the intake passage freely, these shutters being then in the positions indicated in Figures 1 and 10, the sliding shutter L will then be in the position shown in Figure 1 so as to substantially close the annular lateral opening K into the intake passage. On the other hand when the shutters M have been turned into the positions in which they are shown in Figures 2 and 9 so as to obstruct the flow of air into the forward end of the intake passage, the sliding annular shutter L will then be moved forward into the position shown in Figure 2 so as to leave the annular intake passage K open. The air which then flows into the intake passageway F is drawn in through an opening $H^2$ in the cowling and flows forward over the power plant and inwards through the opening K. When the shutters M have been turned so as to allow air to flow directly into the opening at the end of the intake passage F some of this air may be allowed to flow out laterally through the annular opening K past the sliding shutter L in the manner indicated by the arrows in Figure 1. This air will then flow over the power plant and out through the opening H². It is to be noted that when the air is drawn in through the opening H² it is in effect drawn from the air in the boundary layer around the cowling H. As the air from the atmosphere changes direction to enter through the opening H² and flow along through the space H¹ into the air intake F, a separation will be effected outside the cowling from moisture in the form of rain, snow and ice. A further separation may occur as the direction of air flow is completely reversed when it flows through the space H¹. There may be yet a further separation as the air flow again changes direction in passing through the annular opening K.

Hot gas may be led to and can flow through the radial shutters M by tapping off gas, for example from the exhaust gas passage between the turbine C and the exhaust nozzle D. As shown in Figures 1 and 2 a short pipe P passing through the casing of the exhaust passage serves to tap off some of the gases and deliver them into piping P¹ which is carried forward through the space H¹ around the plant to the fairing member G which is hollow. As mentioned hot gas can flow through each radial shutter M the shutter being formed so as to permit of this and each gudgeon or like pin M¹ which carries the shutter in a rotatable manner is hollow, or at least one of these pins is hollow, so that the hot gas can pass through it into the shutter. The gas passing through each shutter can either be delivered into the nose piece J at the forward end of the cowling or through a series of holes in the edge of each shutter.

Figure 4:
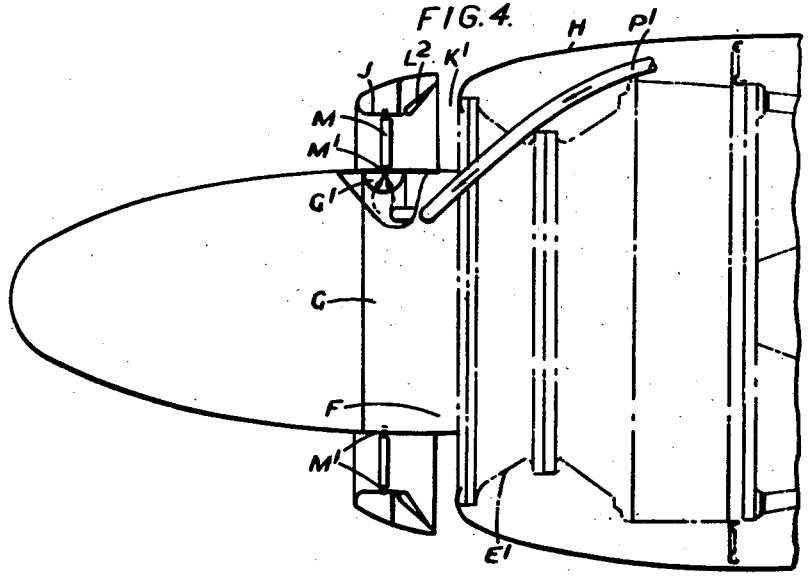
Figure 4 is a somewhat diagrammatic longitudinal sectional elevation of the forward part of a power plant showing on a larger scale than Figure 1 an alternative arrangement of the lateral annular intake opening into the intake passage. In this figure the forwardly facing annular opening is shown as being closed by the radial shutters while the lateral intake opening is open.

Figures 4 and 5 show a rather different arrangement of parts of the apparatus. The hot gas coming through the piping P¹ is here led into an annular chamber G¹ within the fairing G and in this chamber lie the hollow trunnions M¹ at the inner ends of the radial shutter members M. The hot gas can thus flow through the shutter members and either issue through holes in the edge of each shutter or pass right through each shutter into the hollow nose piece J. In this construction the lateral annular air intake passage K¹ communicates directly with the outer air so that air from the boundary layer can pass directly into the intake passage F. The air flow through the lateral intake K¹ is here controlled by a series of gill-like flaps L² adapted to be rotated according as it is desired to close or open the intake K¹ as the radial shutters M are rotated. Figure 4 shows the radial shutters M rotated so as to prevent direct inflow into the main air intake passage F but the flaps L² are turned so as to allow air to enter through the lateral opening K¹. On the other hand in Figure 5 the lateral intake is shown as being closed by the gill-like flaps L² while the radial shutters M are rotated so as to allow direct inflow of air into the annular intake passage F.

Figure 6 shows a modification of the arrangement shown in Figures 4 and 5 in that here the inflow of air through the lateral intake passage K¹ is controlled by a sliding shutter-like member L³ mounted on the forward end of the cowling H. The movement of this sliding shutter L³ may conveniently be interconnected with the means by which the radial shutters M are rotated in a manner similar to that described and illustrated with reference to Figures 9, 10 and 11.

Referring to Figure 7 which shows a further modification in the arrangement, the chief feature here is the absence of any means for controlling the inflow through the annular intake passage K¹. A further feature is that the hot gas coming through the piping P³ is led first into the hollow nose piece J¹ whence it passes through the hollow trunnions M¹ into each radial shutter M. In this case each of these shutters is provided in one edge with a series of holes M⁴ through which the hot gas can issue into the air stream flowing into the annular intake passage F.

In Figure 8 there is shown an arrangement in which again no means are provided for controlling or stopping the air inflow through the lateral passage K¹. In this case and as distinct from the arrangement shown in Figure 7 the hot gas is led through piping P¹ into an annular chamber G¹ in the fairing G as in the constructions previously described with reference to Figures 4, 5 and 6. The hot gas can flow from the annular chamber G¹ into the radial shutters M through the inner trunnions about which these shutters rotate.

What we claim as our invention and desire to secure by Letters Patent is:

1. An air intake system for an internal combustion power plant comprising in combination a power plant, a cowling within which the power plant is mounted with an annular space between the cowling and the power plant through which air can flow over the power plant, a centrally situated fairing at the forward end of the power plant, an annular intake passage around the said fairing through which air can flow to the power plant, a forwardly facing annular intake opening at the end of the said annular intake passage, the inner wall of this intake opening of the intake passage being constituted by the surface of the said central fairing while the outer wall of the said opening and passage is constituted by a hollow structure at the forward end of the said cowling, a plurality of sector-shaped shutters extending radially across the said forwardly facing annular intake opening and each rotatably mounted on trunnions at their ends respectively in the said central fairing and in the said hollow structure forming the outer wall of the intake opening and passage, at least one of the trunnions of each of the said radial sector-shaped shutters being hollow and the shutter formed so that gas entering through the trunnion can flow through the shutter, means for rotating all the said radial shutters simultaneously whereby they may be positioned either so as to permit the free inflow of air to the said forwardly facing annular intake passage or to obstruct this inflow, means for drawing hot gas from the said power plant and delivering it to parts adjacent to the said forwardly facing intake opening so that this hot gas can flow through the said radial shutters, and an annular opening in the outer wall of the said intake passage constituting a lateral intake through which air can flow into the said annular passage.

2. An air intake system for an internal combustion power plant comprising the parts set out in claim 1 and in which means are provided for controlling the air inflow through the said lateral intake opening, such control means being connected with the said means for rotating the said radial shutters so that, when the shutters are positioned to allow the free inflow of air through the said forwardly facing annular intake opening the inflow of air through the said lateral intake passage will be obstructed, but when the shutters are turned to prevent the inflow of air through the forwardly facing intake opening air will be permitted to enter through the lateral opening.

3. An air intake system for an internal combustion power plant comprising the parts set out in claim 1 and in which there is a sliding shutter serving to control the inflow of air through the said lateral intake opening with means for moving this shutter which means are interconnected with the said means for rotating the said radial shutters, whereby when the radial shutters are positioned to allow free inflow of air through the said forwardly facing intake opening the said sliding shutter will be moved to prevent the inflow of air through the said lateral intake opening, but on the other hand the said sliding shutter will be moved to allow air to flow in through the lateral opening when the radial shutters are positioned to obstruct the inflow of air through the forwardly facing intake opening.

4. An air intake system for an internal combustion power plant comprising the parts set out in claim 1 and in which each of the said radial shutters is provided with a plurality of holes in one of its radial edges through which holes can issue the hot gas flowing to the interior of the shutter through at least one of its trunnions.

5. An air intake system for an internal combustion power plant comprising the parts set out in claim 1 and in which a plurality of hinged gills control the inflow of air through the said lateral intake opening with means for moving these gills so as to permit the flow of air through the lateral opening or obstruct this air flow according as the air flow through the said forwardly facing intake opening is permitted or obstructed.

HERBERT SAMMONS.
CECIL LOUIS COWDREY.

No references cited.